United States Patent [19]

Kitamura

[11] Patent Number: 4,576,411
[45] Date of Patent: Mar. 18, 1986

[54] VEHICLE SEAT

[75] Inventor: Masahiro Kitamura, Akishima, Japan

[73] Assignee: Tachikawa Spring Co., Ltd., Japan

[21] Appl. No.: 576,482

[22] Filed: Feb. 2, 1984

[51] Int. Cl.⁴ .......................... A47C 1/00; E05D 11/10
[52] U.S. Cl. ...................................... 297/353; 16/332;
         16/344; 297/356; 297/403; 297/408
[58] Field of Search ........ 297/353, 354, 356, 363–367,
         297/403, 408; 16/331, 332–334, 344, 348, 360

[56] References Cited

U.S. PATENT DOCUMENTS

| | | | |
|---|---|---|---|
| 773,720 | 11/1904 | Drury | 297/408 X |
| 979,149 | 12/1910 | Gay | 297/356 |
| 3,849,834 | 11/1974 | Mayer | 16/332 |
| 3,955,240 | 5/1976 | Schuh et al. | 16/332 X |
| 4,322,111 | 3/1982 | Barley et al. | 297/408 X |

FOREIGN PATENT DOCUMENTS

| | | | |
|---|---|---|---|
| 939602 | 1/1974 | Canada | 297/356 |
| 155128 | 9/1982 | Japan | 297/408 |

Primary Examiner—William E. Lyddane
Assistant Examiner—Peter R. Brown
Attorney, Agent, or Firm—Cushman, Darby & Cushman

[57] ABSTRACT

A driving seat for use in an industrial vehicle such as a forklift, tractor and combine is disclosed. The driving seat comprises a seat back which is divided into two portions, i.e., upper and lower portions such that the upper portion can be folded backwards relative to the lower portion so as to lower the height of the seat back. The upper portion of the seat back is connected with the lower portion of the seat back by means of a rotary support device which is capable of performing such folding operation of the upper portion of the seat back by simply pressing against the upper portion itself.

8 Claims, 7 Drawing Figures 4,576,411

VEHICLE SEAT

BACKGROUND OF THE INVENTION

1. Field of the Invention

The present invention relates to a vehicle seat and more particularly to a driver's seat for use in an industrial vehicle such as a forklift, a tractor or a combine.

2. Description of the Prior Art

In industrial vehicles, a driver must not only perform ordinary driving tasks but must also operate operation levers for hydraulic devices or the like. These operation levers are in most cases provided at the rear of a driver's seat and it is almost impossible for the driver to operate them while he is seated on the driver's seat since the seat back normally gets in the way. Thus, the driver must climb down from his vehicle to perform such operations, which results in decreased work efficiency and also in increased fatigue of the driver.

SUMMARY OF THE INVENTION

A vehicle seat according to the invention is capable of eliminating the drawbacks in the above mentioned prior art seat.

Accordingly, the principal object of the invention is to provide a driving seat in which a seat back can be lowered in height so that a driver can handle operation levers while he is seated on the driving seat.

In order to attain the above object, according to the invention, the seat back of the driving seat is divided into two parts, i.e., upper and lower portions such that the upper portion can be folded backwardly relative to the lower portion to lower the height of the seat back.

Another object of the invention is to provide a simple structure which is capable of performing folding operations by means of an operator pressing against the seat back itself without requiring any operational members such as lever knobs or the like.

To achieve this object, in the present invention, the upper portion of the seat back is foldably connected with the lower portion of the same by means of a rotary support device including lock means which is rotated and locked as the upper portion of the seat back is rotated. The seat back upper portion can thus be locked and retained in its stand-up and folded positions relative to the lower portion.

BRIEF DESCRIPTION OF THE DRAWINGS

The present invention will be explained with reference to the drawings which illustrate preferred embodiments of the invention.

DETAILED DESCRIPTION OF PREFERRED EMBODIMENTS OF THE PRESENT INVENTION

Figure 1:
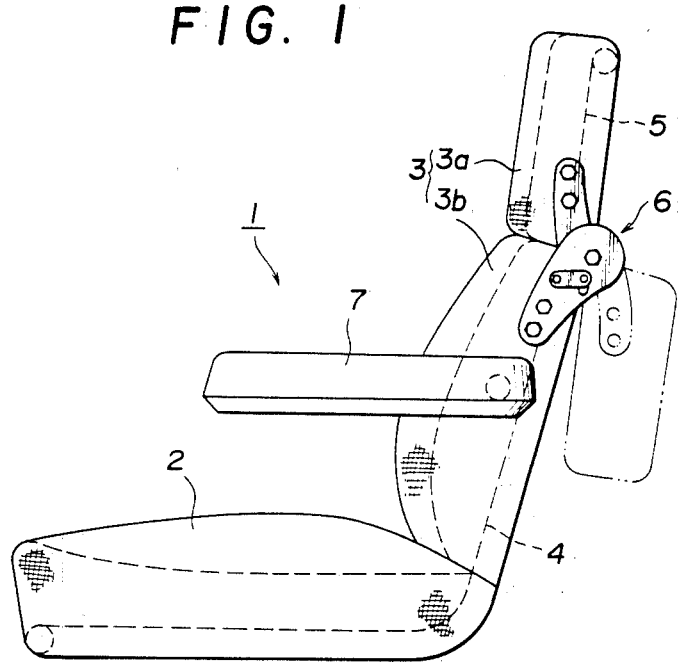
FIG. 1 is a side view of an example of a vehicle seat according to the invention.

In FIG. 1, reference numeral (1) designates a vehicle seat, for example, an entire seat for industrial vehicle such as a forklift, (2) represents a seat cushion and (3) denotes a seat back. Seat back (3) is divided into an upper portion (3a) and a lower portion (3b). Lower portion (3b) is defined by the seat cushion (2) and a continuous frame (4), while upper portion (3a) is defined by an individual frame (5). The upper portion (3a) of this seat back (3) is connected with the lower portion (3b) by means of a rotary support device (6) such that it can be shifted from a backrest surface forming position, that is, its extended state, to a folded position or its rearwardly inverted state relative to the lower portion (3a). An arm-rest (7) is mounted onto the side surface of the lower portion (3b) of the seat back (3).

Figure 2:
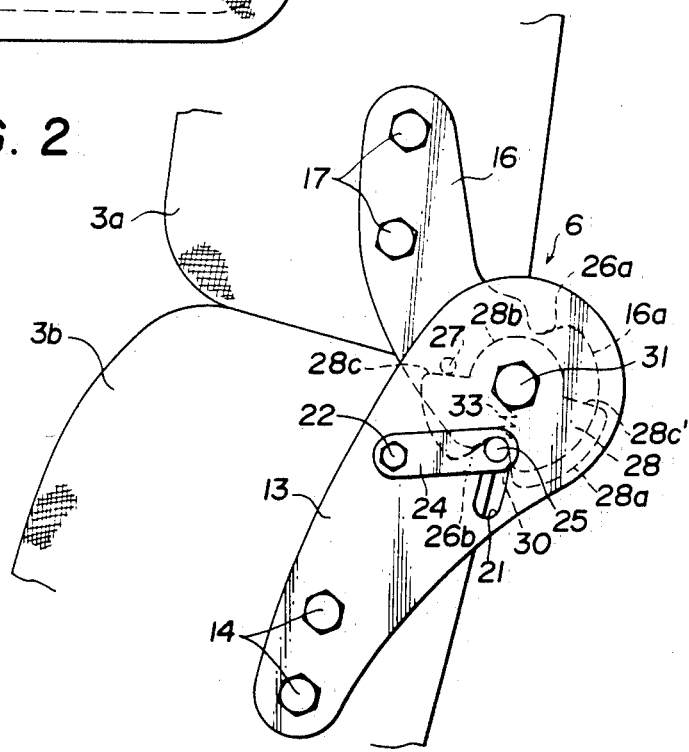
FIG. 2 is an enlarged side view of main portions of the embodiment shown in FIG. 1.
Figure 3:
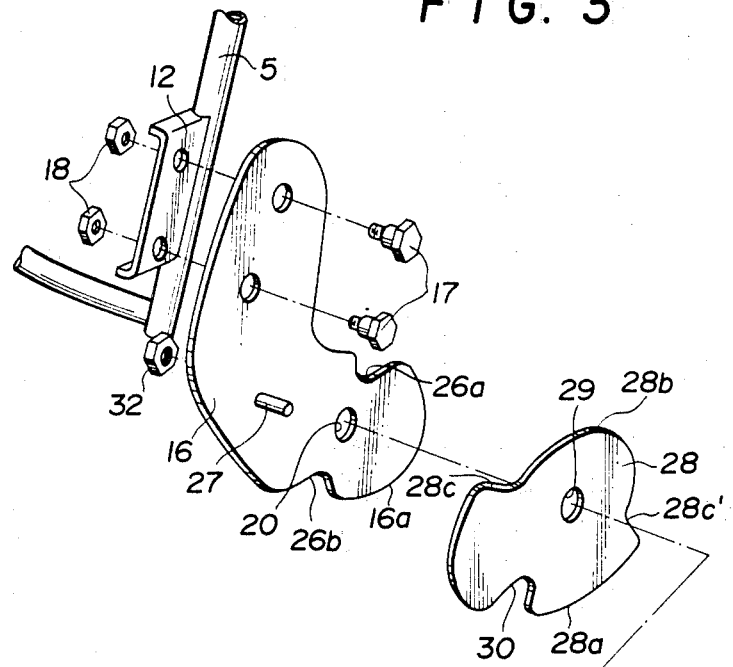
FIG. 3 is an exploded, perspective view of an embodiment of rotary support devices to be used in the vehicle seat of the invention; and, FIGS. 4(A), (B), (C), and (D) are views for illustrating the folding operation of an upper portion of a seat back with respect to a lower portion by means of the rotary support device of the invention.
Figure 3:
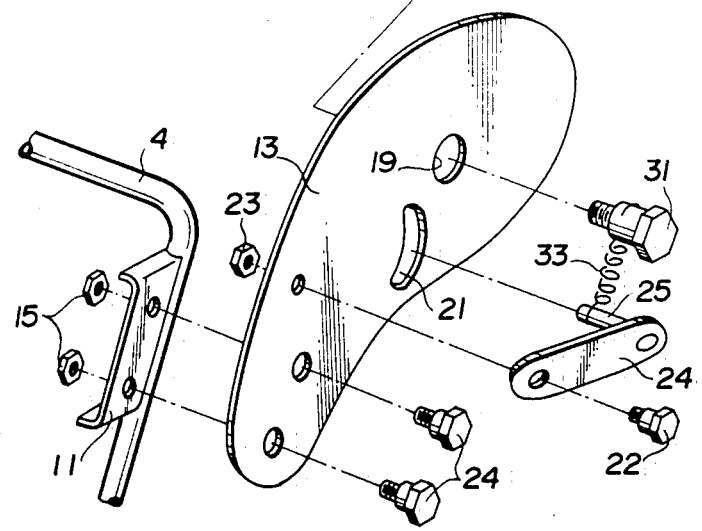

FIGS. 2 and 3 illustrate an embodiment of the rotary support device (6) of the invention. Brackets (11) and (12) are respectively fixed to the upper portion of the frame (4) of the seat back lower portion (3b) and the frame (5) of the seat back upper portion (3a). A fixing side plate (13) is mounted to the bracket (11) on the side of the seat back lower portion (3b) by means of bolts (14) and nuts (15), while a movable side plate (16) is attached to the bracket (12) on the side of the seat back upper portion (3a) by means of bolts (17) and nuts (18). Both of these plates (13) and (16) are formed in their free end sides with axial bores (19) and (20), respectively. The fixed side plate (13) is provided with a vertically-oriented elongated guide slot (21) which is located adjacent to and downwardly of the axial bore (19) and is bent forwardly in a concave way. Through this guide slot (21) is inserted a lock pin (25) extended from the tip end of an arm (24) which is swingably mounted by means of a bolt (22) and a nut (23) to the outer surface of the front edge of the plate (13). On the other hand, the movable side plate is formed along its free end side peripheral edge (16a) with engagement recesses (26a) and (26b) which are located opposite to each other in a vertical direction about the axial bore (20), and a pin (27) is provided between and forwardly of these two engagement recesses (26a) and (26b).

Between the thus arranged two plates (13) and (16) is interposed a lock guide plate (28). This lock guide plate (28) is formed at its center with an axial bore (29) to be in communication with the above two axial bores (19) and (20) respectively formed in said two plates (13) and (16), and it has an outer periphery including two half peripheral sections (28a) and (28b) centering around the axial bore (29). One peripheral half section (28a) is formed to be larger in diameter than the free end side peripheral edge (16a) of the movable side plate (16), while the other half peripheral section (28b) is formed to have a radius equal to or smaller than a distance between the axial bore (20) of the movable side plate (16) and the engagement recesses (26a)(26b). Between these two half peripheral sections (28a) and (28b) there are provided straight edges (28c) and (28c') extending in a direction of the diameter, and one peripheral half section (28a) is, in its central portion, formed with an engagement recess (30) to be substantially matched to the above mentioned engagement recesses (26a) and (26b).

After the lock guide plate (28) is interposed between the fixed side and movable side plates (13) and (16) and the axial bores (19), (29), (20) are brought into communication with each other, a bolt (31) is inserted through these three bores from outside and is then tightened by a nut (32) inside to be fixed, while between the bolt (31) and the lock pin (25) of the arm (24) is extended a spring

(33) such that this spring (33) normally biases the lock pin (25) toward the bolt (31), i.e., in a direction of the center.

Figure 4A:
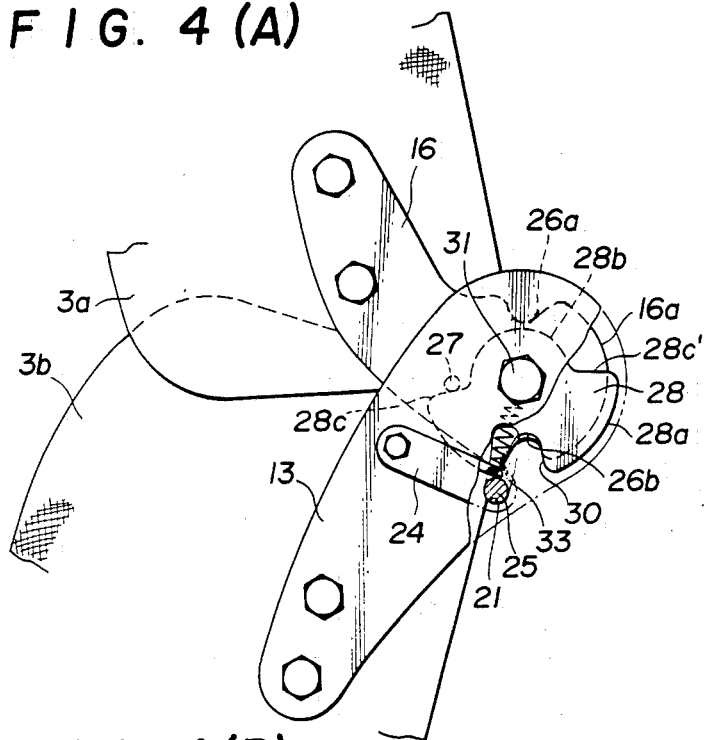

FIGS. 4(A), (B), (C), and (D) illustrate the operation of the upper and lower portions (3a) and (3b) of the seat back (3) which are connected with each other by means of the thus arranged rotary support device (6), that is, the folding/extending operation of the upper portion (3a).

While the seat back upper portion (3a) is in its extended state, with the pin (27) of the movable side plate (16) being in contact with the front straight edge (28c) of the lock guide plate (28), the lower engagement recess (26b) of the movable side plate (16) and the engagement recess (30) of the lock guide plate (28) are superimposed in a manner to correspond to the elongated guide slot (21) of the fixed side plate (13) of the seat back lower portion (3b). The lock pin (25) of the arm (24) is thus biased into engagement with both of the recesses (26b) and (30) by means of the elastic force of the spring (33), so that the seat back upper portion (3a) is locked to the lower portion (3b) in its extended state to form a back-rest surface.

In this condition, if the seat back upper portion (3a) is pushed and inclined forwardly, then the movable side plate (16) is rotated forwardly about the bolt (31) and at the same time the lock guide plate (28) is rotated by means of the pin (27). When both of the plates (16) and (28) are rotated, the pin (25) of the arm (24) is pushed by the inner edge portions of both engagement recesses (26b) and (30) to slide downwardly along the elongated guide slot (21) against the elastic force of the spring (33) out of these two engagement recesses (26b) and (30), so that both plates (16) (28) are unlocked. If such plates (16) and (28) are rotated further, then the lock pin (25) is brought into contact with one half peripheral section (28a) of the lock guide plate (28) which is larger in diameter than the peripheral edge (16a) of the movable side plate (16), (FIG. 4(A)). During such operation, since the lock pin (25) is elastically biased in a direction of the center of rotation of both plates (16) and (28) by the spring (33), the lock guide plate (28) is maintained in its no rotating state.

Figure 4B:
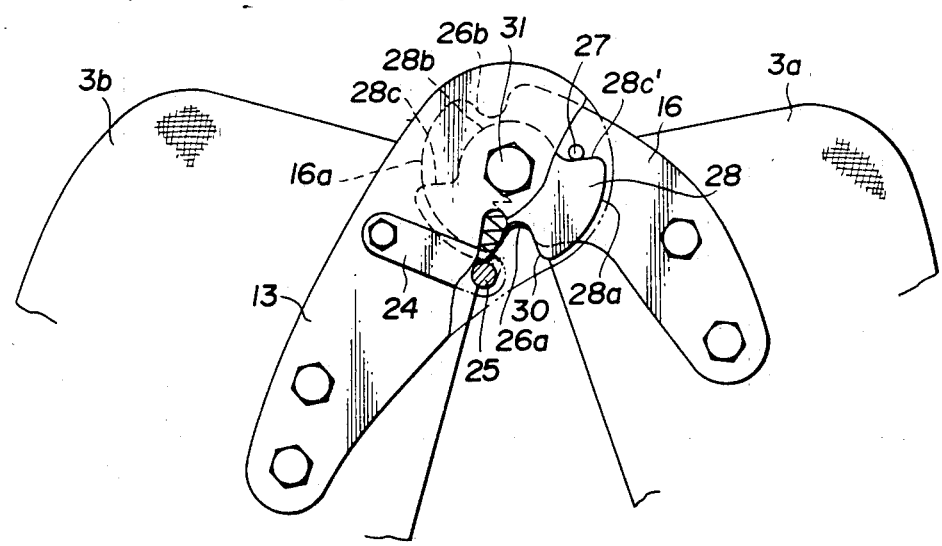

In this condition, if the seat back upper portion (3a) is inverted rearwardly, then the movable side plate (16) is rotated independently of the lock guide plate (28) and when the pin (27) is brought into contact with the rear straight edge (28c') of the lock guide plate (28) the upper engagement recess (26a) is caused to stop temporarily in a state in which it is superimposed with the engagement recess (30) of the lock guide plate (28), (FIG. 4B).

Figure 4C:
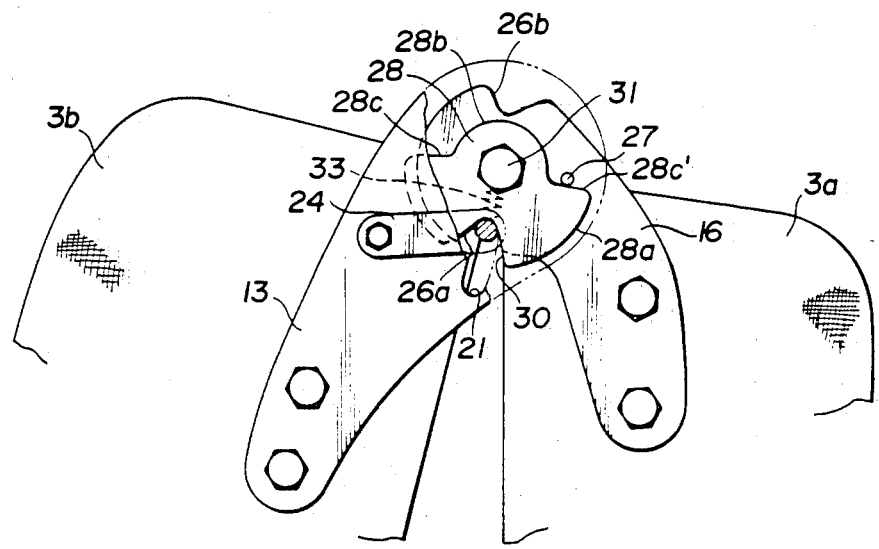

Then, if the seat back upper portion (3a) is pushed to rotate further, then the lock guide plate (28) is rotated along with the movable side plate (16) while it is being pushed by the pin (27), and, when both engaging recesses (26a) and (30) are located so as to correspond to the elongated guide slot (21) of the fixed side plate (13), the lock pin (25) is slid along the elongated guide slot in the direction of center of rotation by the elastic force of the spring (33) into engagement with both engagement recesses (26a) and (30). This engagement stops the rotation of both plates (16) and (28) relative to the fixed side plate (13) and maintains the seat back upper portion (3a) in a state where it is inverted toward the rear surface of the lower portion (3b), that is, in its folded state (FIG. 4C), so that the height of the seat back (3) has been lowered.

Figure 4D:
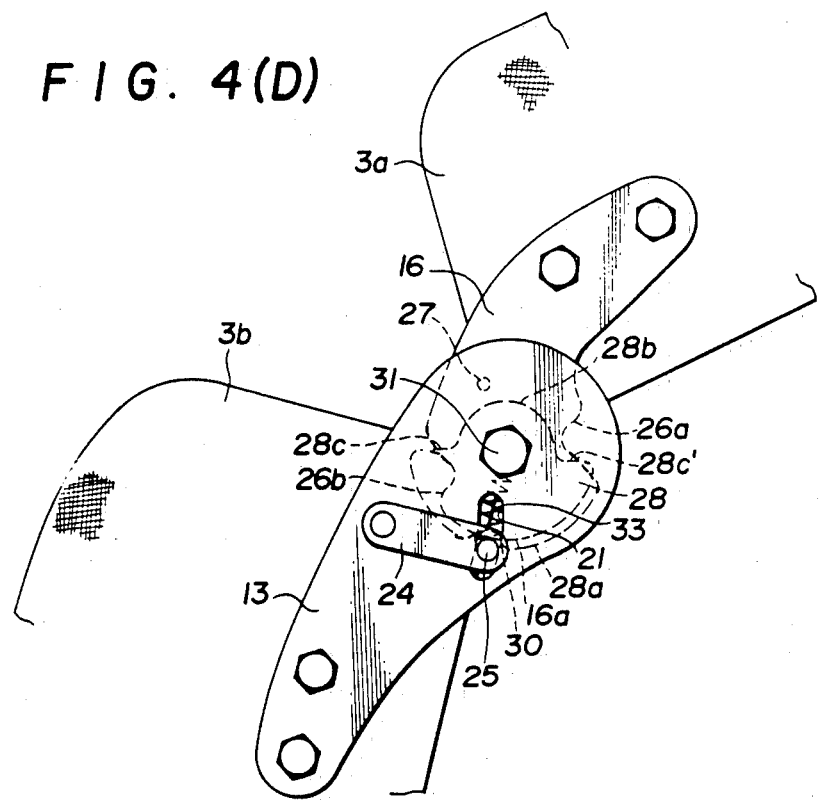

When the seat back (3) is returned from such state to the state in which the back-rest surface is formed, it is necessary to simply press up the seat back upper portion (3a) in a direction towards its extended position. In other words, if the seat back upper portion (3a) is pushed upwardly, then the movable side plate (16) is rotated upwardly to extrude out the lock pin (25) by means of the inner edge portion of the engagement recess (26a) and is rotated further with its peripheral edge (16a) in sliding contact with the lock pin (25). During this operation, since the pin (27) is separated from the rear straight edge (28c') of the lock guide plate (28), the lock guide plate (28) is prevented from rotation with its engagement recess (30) mouth edge portion being engaged with the lock pin (25), so that only the movable plate (16) is rotated upwardly (FIG. 4D). In this state, if the seat back upper portion (3a) is further rotated and extended, then the movable side plate (16) is rotated upward to its highest position with its lower engagement recess (26b) being superimposed with the engagement recess (30) of the lock guide plate (28) and the lock pin (25) is brought into sliding engagement with the innermost ends of both of the engagement recesses (26b), (30), so that both plates (16), (28) are locked relative to the fixed side plate (13), (FIG. 2), and the seat back (3) is maintained again in its state to form the back-rest surface.

In the above-mentioned manner, the seat back (3) can be freely changed from its back-rest surface forming position to its folded position in which its height is lowered.

In the above embodiment, if the movable side plate (16) is formed with one or more engagement recesses between the above-mentioned upper and lower engagement recesses (26a) and (26b), the seat back upper portion (3a) could be maintained in its rearwardly inclined position. In this case, the engagement operation is performed while the seat back upper portion (3a) is once swung backwardly into its folded position and is then rotated to stand up from the folded position.

Also, according to the invention, the positional relationship of components can be varied as necessary. For example, the lock pin (25) may be arranged such that it can be engaged with the movable side and lock guide plates (16) and (28) from their upper edges. The fixed side plate (13) may be provided with one or more engagement recesses, or the movable side plate (16) can be structured to have the lock pin (25).

As described before, the present invention provides an improved vehicle seat in which the seat back of the seat is divided into two upper and lower portions with the upper portion being foldable rearwardly relative to the lower portion and in which such folding operation can be performed by pressing against or pushing up the seat back upper portion itself without using any lever, knob or the like. In practice, therefore, a driver is able to carry out the folding operation of the seat back while he remains seated on the seat and faces forward. Also, since such folding operation of the seat back allows the driver to perform operations behind the seat while he remains seated on the seat, he need not climb down from his car on each operation, which results in a greatly improved operationability as well as the reduced fatigue of the driver. The present invention, therefore, is very useful especially when it is used as a driving seat in an industrial vehicle where a driver has to carry out operations at the rear of the driving seat.

It should be understood that the invention is not limited to the industrial vehicle but it can be applied to other vehicles to be loaded with goods behind the seat.

What is claimed is:

1. A vehicle seat comprising:
    upper and lower seat back portions respectively including upper and lower side plates;
    connecting means for connecting said upper side plate of said upper seat back portion to said lower side plate of said lower seat back portion so that said upper seat back portion is capable of pivotal movements relative to said lower seat back portion about a pivot axis between an extended position wherein said upper seat back portion extends above said lower seat back portion, and a folded position wherein said upper seat back portion is adjacently folded against said lower seat back portion;
    a lock guide plate, said connecting means pivotally coupling said lock guide plate to said upper side plate and said lower side plate for independent pivotal movements relative thereto about said pivot axis;
    said upper side plate including means defining first and second recesses for respectively establishing said extended and retracted positions of said upper seat back portion, and projection means rigidly carried with said upper side plate during said rotational movements about said pivot axis;
    said lock guide plate including means defining a lock recess selectively registrable with said first and second recesses when said upper seat back portion is pivoted into said extended and folded positions, respectively, and first and second opposing engagement surfaces; and
    locking means for removably locking said upper seat back portion in said extended and retracted positions, said locking means including engagement means movable between (i) an engaged position wherein said engagement means is accepted in said lock recess and one of said first and second recesses in registry therewith to removably lock said upper seat back portion in said extended and folded positions, respectively, and (ii) a disengaged position wherein said engagement means is operatively separated from said lock recess and said one of said first and second recesses in registry therewith;
    said projection means (a) for engaging said first surface of said lock guide plate in response to pivotal movement of said upper seat back portion in a first direction forwardly of said extended position to cause said lock guide plate to also be pivotally moved in said first direction together with said upper side plate such that said registered first recess and said lock recess become misaligned with said engagement means to thereby move said engagement means from said engaged position and into said disengaged position, (b) said engagement means being maintained in said disengaged position to permit said upper seat back portion to be pivoted in a second direction, opposite to said first direction, until said projection means engages said second engagement surface, (c) said projection means thereafter for pivoting said guide lock plate in said second direction together with said pivotal movement of said upper side plate to register said lock recess and said second recess with said engagement means to release said engagement means from said maintained disengaged position and to cause said engagement means to move into engagement with said lock recess and said second recess whereby said upper seat back portion is removably locked in said folded position.

2. A vehicle seat as in claim 1 wherein said engagement means includes an arm pivotably mounted at one end of said lower side plate and including at the other end thereof an engagement pin.

3. A vehicle seat as in claim 2 further comprising biasing means for biasing said engagement means into said engaged position.

4. A vehicle seat as in claim 1 wherein said lock guide plate is interposed between said upper and lower side plate means.

5. A vehicle seat as in claim 4 wherein said lower side defines a slot and wherein said engagement means includes an engagement pin slidably mounted in said slot.

6. A vehicle seat as in claim 5 wherein said engagement means includes an arm pivotally connected at one end thereof to said lower side plate, said engagement pin being mounted to the other end of said arm.

7. A vehicle seat as in claim 6 wherein said engagement means includes biasing means to bias said engagement means into said engaged position.

8. A device to pivotally couple upper and lower portions of a vehicle seat back comprising:
    first and second plates respectively associated with one and another of said upper and lower seat back portions;
    a lock guide plate including a lock recess and first and second opposing engagement surfaces;
    connection means for connecting said first plate, said second plate and said lock guide plate one to another to permit for independent pivotal movements thereof about a pivot axis to thereby permit pivotal movements of said first plate between first and second pivot positions relative to said second plate;
    said first plate including first and second recesses and projection means selectively engageable with said first and second engagement surfaces to register said first and second recesses with said lock recess, respectively; and
    locking means for removably locking said first plate in said first and second pivot positions, said locking means including engagement means movable between (i) an engaged position wherein said engagement means is accepted in said lock recess and a registered one of said first and second recesses to removably lock said first plate in said first and second positions, respectively, and (ii) a disengaged position wherein said engagement means is separated from said lock recess and said registered one of said first and second recesses;
    said projection means (a) for engaging said first surface of said lock guide plate in response to pivotal movement of said first plate in a first direction in advance of said first position to cause said lock guide plate to also be pivotally moved in said first direction together with said first plate such that said registered first recess and said lock recess become misaligned with said engagement means to thereby move said engagement means from said engaged position and into said disengaged position, (b) said engagement means being maintained in said disengaged position to permit said plate to be thereafter pivoted in a second direction, opposite to said first direction, until said projection means engages said second engagement surface, (c) said projection means thereafter for pivoting said guide lock plate in said second direction together with said pivotal movement of said first plate to register said lock recess and said second recess with said engagement means to release said engagement means from said maintained disengaged position and to cause said engagement means to move into engagement with said lock recess and said registered second recess whereby said upper seat back portion is removably locked in said second position.

* * * * *